US006301783B1

(12) United States Patent
Deavers

(10) Patent No.: US 6,301,783 B1
(45) Date of Patent: Oct. 16, 2001

(54) SHAFT MANIPULATING AND CENTERING PROCESS

(76) Inventor: Andrew Jason Deavers, 12831 Elk Run Rd., Rte. 806, Midland, VA (US) 22728

( * ) Notice: Subject to any disclaimer, the term of this patent is extended or adjusted under 35 U.S.C. 154(b) by 0 days.

(21) Appl. No.: 09/577,983

(22) Filed: May 25, 2000

Related U.S. Application Data

(62) Division of application No. 09/201,760, filed on Dec. 1, 1998, now Pat. No. 6,170,140.

(51) Int. Cl.[7] .......... B23P 17/00

(52) U.S. Cl. .......... 29/898.07; 29/271; 29/281.5; 29/464

(58) Field of Search .......... 29/898.07, 898.09, 29/464, 271, 240, 281.5, 466; 81/484

(56) References Cited

U.S. PATENT DOCUMENTS

| | | | | |
|---|---|---|---|---|
| 4,295,276 | | 10/1981 | Ellington, III | 33/181 R |
| 4,763,393 | * | 8/1988 | Gee | 29/238 |
| 4,934,037 | * | 6/1990 | Schuerg et al. | 29/283 |
| 4,949,601 | | 8/1990 | Broadwin et al. | 81/52 |
| 5,018,414 | | 5/1991 | Naumann | 81/484 |
| 5,363,543 | | 11/1994 | Boyd et al. | 29/464 |
| 5,443,471 | * | 8/1995 | Swajgu | 606/99 |

OTHER PUBLICATIONS

Reg. No. H226 Published Mar. 3, 1987 N.F. Willett.

Eaton Fuller Heavy Transmissions Service Manual, 10/95 pp. 99–102.

OTC Tools & Equipment for the Professional, SPV Corp., 1/97, tool nos. 7108 and 7109.

* cited by examiner

*Primary Examiner*—S. Thomas Hughes
*Assistant Examiner*—Marc W. Butler
(74) *Attorney, Agent, or Firm*—Clyde I. Coughenour

(57) ABSTRACT

A shaft manipulating centering and assembly tool for use in a housing bore has four basic members, a manipulating member, a pressing member, a locking member and a power drive member. The manipulating member has an outer surface the radius of the bore and an inner surface that includes one section the radius of the shaft and a flat section. The pressing member has limited rotation within one end of the manipulating member and can push against the bore wall or shaft and can turn the manipulating member. The locking bar member anchors the tool on a housing stud. The drive member turns the pressing member and manipulating member and holds the locking bar in place. By placing the tool beside the shaft within the bore and turning it in a first direction, the shaft is lifted onto the manipulating member and the locking bar moves beside the housing stud. By rotating it in the opposite direction, the locking bar engages the stud and the pressing member moves the shaft to one end of the bore on the manipulating member flat section so that the shaft can be easily turned. By further rotation in the first direction the shaft is lifted by the manipulating member flat section until it falls into its arcuate section where it is centered in the; bore. By centering the rear end of the shaft with a centering device, the tool can be removed and bearings inserted in the front end of the housing, after which the centering device in the rear can be removed and bearings inserted in the rear bore around the shaft rear end.

20 Claims, 3 Drawing Sheets

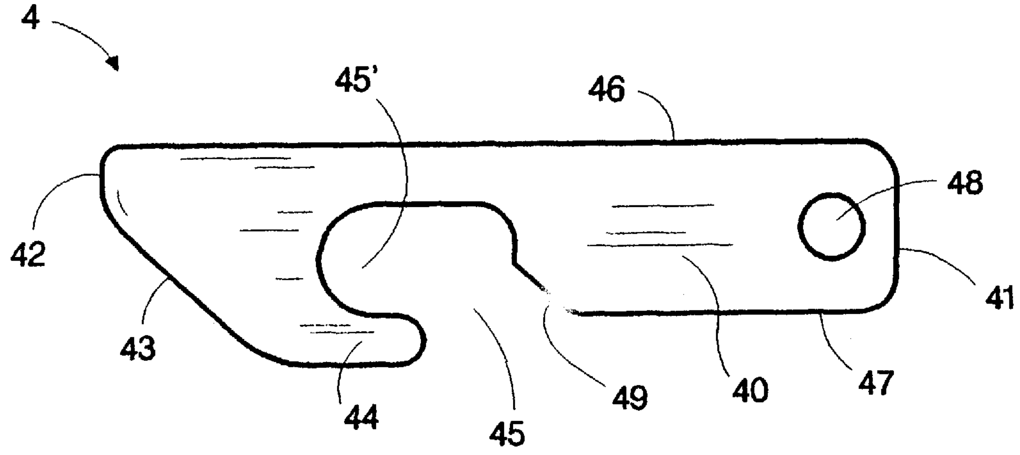
FIG. 7
FIG. 10
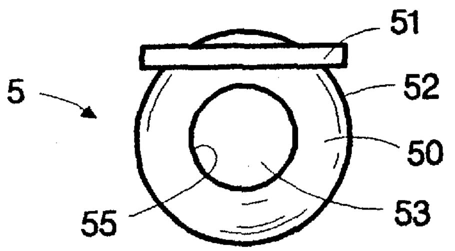
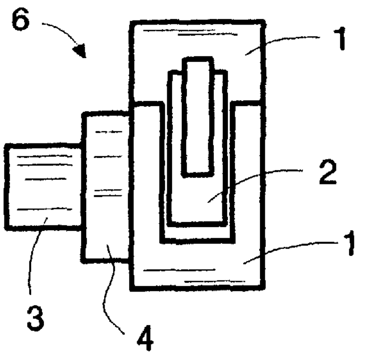
FIG. 8
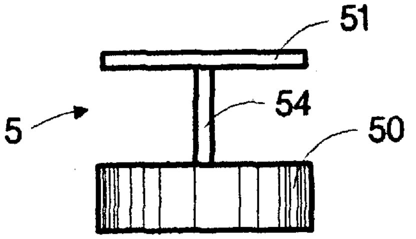
FIG. 11
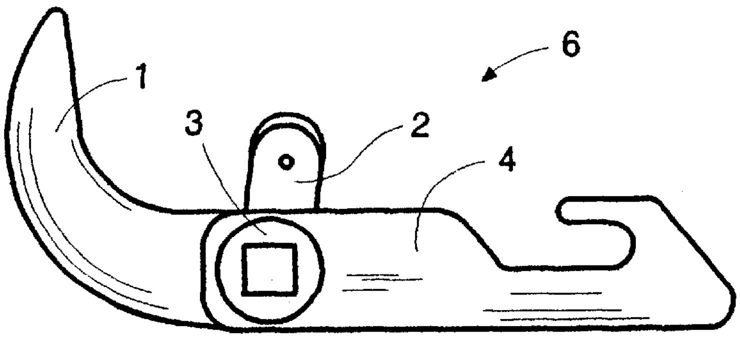
FIG. 9

SHAFT MANIPULATING AND CENTERING PROCESS

CROSS-REFERENCE TO RELATED APPLICATION

This is a division of U.S. application Ser. No. 09/201,760 filed Dec. 1, 1998 now U.S. Pat. No. 6,170,140 issued Jan. 9, 2001 entitled SHAFT MANIPULATING AND CENTERING TOOL.

BACKGROUND OF THE INVENTION

1. Field of the Invention

The invention relates to a tool for manipulating a shaft housed in a bore, for positioning a shaft in a bore, so that the shaft can easily be turned by one finger for alignment and assembly, for centering a shaft within a bore, and for inserting bearings within a bore around a shaft.

2. Description of Related Art

Shaft centering and alignment tools and procedures for using them are common. A special problem exists in the assembly of gearing, such as in transmissions, where in addition to centering one or more shafts, the gears on two or more shafts must be aligned so as to mesh at specific teeth. This occurs where one shaft must be timed with or synchronized with another shaft. This synchronization and alignment is a particular problem where plural functions must be performed at the same time and the weight of the components makes it necessary to use three or more hands.

Solutions to these problems have been suggested. As examples of tools used to manipulate and center shafts, and to assemble shafts having gears thereon, tool numbers 7108 and 7109 sold by OTC Tools in their catalogue printed January 1997 under the title *OTC Tools & Equipment for the Professional* by SPV Corp. of 655 Eisenhower Drive, Owalonna, Minn. 550605-0995 U.S.A. and assembly procedures such as disclosed by the *Eaton® Fuller® Heavy Duty Transmissions Service Manual* of October 1995, pages 99–102 by the Eaton Corporation, Truck Components Operations- North America, P.O. Box 4013, Kalamazoo, Mich. 94003, are representative.

The one piece "U" shaped OTC tool, 7108 or 7109, disclosure states that the tool permits "one man" installation of bearings and the ability to slide a counter shaft aside from a main shaft to line up the gears on the shafts. It has been found to be difficult if not impossible for "one man" to use the tool because the weight of the shaft rotates the tool if one hand is not used to keep the tool positioned.

The Eaton® Fuller® service manual discloses alignment and assembly of shafts having gears on the shafts. Included is the use of a screw driver to rotate and align the gears and use of a "U" shaped shaft alignment and centering tool similar to the OTC tools 7108 and 7109. While helpful, these tools are limited in their use and routinely require more than "one man" to align the gears and bring the gears into mesh and center the shaft within the housing bore. The present invention overcomes the shortcomings of the prior shaft manipulating and alignment and centering tools by providing a tool and procedure that results in a truly one man operation.

SUMMARY OF THE INVENTION

A centering and manipulation tool fits into a housing bore having a shaft within the bore. A tool manipulating member has an arcuate outer surface, the same size and shape as the bore, and an inner arcuate area of the same size and shape as the shaft. The inner arcuate area gives way to a flat area that extends to form an essentially wedge-shaped second end. The tool manipulating member works in concert with a presser member that fits within a slot in a first end of the manipulating member. The presser member has a roller in a second end that contacts and selectively presses against either the bore wall or shaft surface. The first end of the presser member has an aperture for a power drive shaft that is firmly secured to it. The first end and side surfaces have flat areas joined by an arcuate surface that permits about 90° relative rotation between the presser member and the manipulation member. The power drive shaft holds a locking bar member adjacent the manipulating member. The locking bar member is free to pivot around the power drive shaft on one end and has a hook, guide areas and a stud recess on a second end that secures the tool in place on a housing by attachment to a stud on the housing. This prevents shaft weight from rotating the tool.

With the tool secured to a housing and in a bore, the power shaft can be rotated in one direction to shift the shaft within the bore and to align a stud with the locking bar recess, then rotated in the other direction to grasp the stud in the locking bar member and press the shaft onto the manipulating member flat inner surface area and against the bore wall surface. In this position, the shaft alone, or with gears attached, and an adjacent shaft, with or without gears on it, can be rotated with one finger. After the shaft is positioned, the tool can be turned in the one direction, moving the shaft up along the bore wall and then having it fall down into the arcuate inner concave area of the manipulating member, centering the shaft within the bore.

With the shaft centered in the front end of a housing by the tool, a one piece shaft positioner can be placed within the bore about the shaft other or second or back end. With the one piece positioner in place, the tool can be removed and the shaft will be held in its centered position. The front bearings can then be inserted around the shaft front end. With the front bearings in place, the one piece positioner can be removed from the rear of the shaft and the rear bearings inserted.

BRIEF DESCRIPTION OF THE DRAWINGS

FIG. 7 is a front view of a locking bar.

FIG. 8 is a side view of the tool members assembled together.

FIG. 9 is a front view of the tool members assembled together.

FIG. 10 is a top view of a one piece shaft centering device and its handle.

FIG. 11 is a front view of the one piece shaft centering device and handle of FIG. 10.

DESCRIPTION OF THE PREFERRED EMBODIMENT

Figure 1:
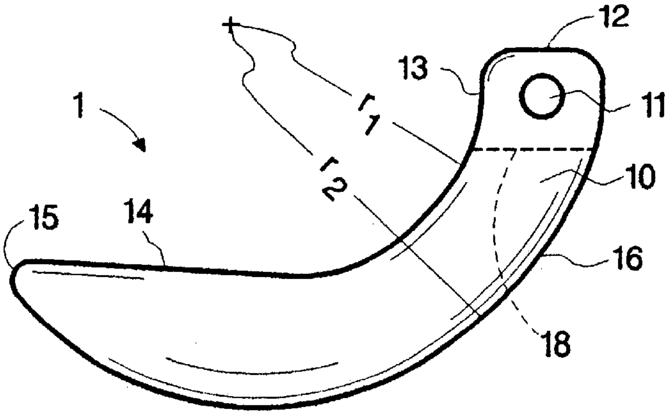
FIG. 1 is a front view of a manipulating member.

The present invention is to a tool that can be used to manipulate a shaft, center a shaft and/or assemble shafts. The tool 6 is composed of four major components, an arcuate shaft manipulating member 1, a pressing member 2, a tool driving member 3, and a locking bar member 4.

Figure 2:
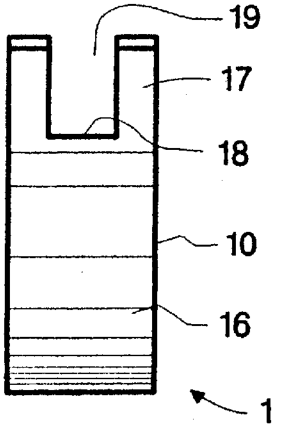
FIG. 2 is an end view of the manipulating member shown in FIG. 1.

The shaft manipulating member 1 is shown in FIGS. 1 and 2. It is an essentially arcuate manipulating body 10 that preferably has an outer side with an outer radius $r_2$ forming a convex surface 16 that is the sane as the inner radius of the housing opening or bore that accommodates the shaft to be manipulated or positioned. The shaft manipulating member has an inner side with an inner concave surface that has an inner radius $r_1$ that forms an inner side arcuate surface 13, that is preferably the same as the radius of the shaft to be manipulated. The inner radius $r_1$ surface 13 gives way to or blends into an inner side flat section 14 that terminates in an outer second end 15 that is essentially wedge-shaped. A power shaft aperture 11, that accommodates a drive or power shaft for manipulating the shaft manipulator member, is provided adjacent the inner first end 12. The inner end 12 is also provided with a slot 19 that defines a shaft manipulating member flat area 18 and forms press securing yoke members 17.

Figure 3:
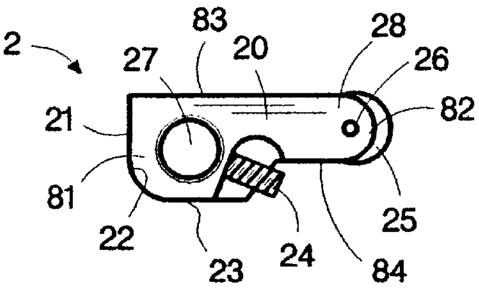
FIG. 3 is a front view of a pressing member with a portion broken away.
Figure 4:
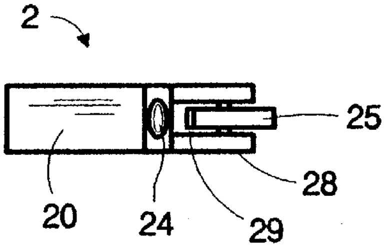
FIG. 4 is a bottom view of the pressing member of FIG. 3.

A press or presser or pressing member 2 is shown in FIGS. 3 and 4. It fits within the press securing yoke members 17 of the shaft manipulator 1. The press member 2 has a press member body 20 with a first end 81, a second end 82, a first side 83 and a second side 84. The first end has a flat section 21 and the second side 84 has a flat section 23. A drive or power shaft aperture 27 is formed adjacent the first end. The first end flat section 21 is joined to the side flat section 23 by an arcuate section 22. The arcuate section 22 has a center of rotation that is the same as the center of rotation for the power shaft aperture 27. Between the first end and second end a threaded hole extends into the power shaft aperture 27 from the second side 84 at the second end extent of the second side flat section 23. The threaded hole accommodates a set screw 24 or other securing means. The second end 82 of the press member 2 has a slot 29 forming yoke members 28. The yoke members 28 are provided with openings that accommodate a roller shaft 26 for a roller 25 held within the slot 29 between the press member yoke members 28.

Figure 5:
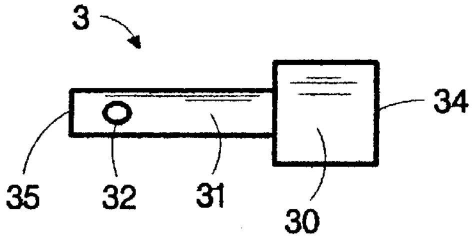
FIG. 5 is a side view of a drive member.
Figure 6:
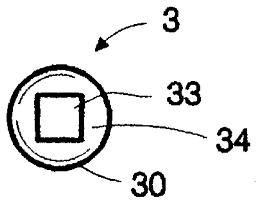
FIG. 6 is an end view of the drive member of FIG. 5.

A power drive member 3 is shown in FIGS. 5 and 6. It is used to turn the tool. The power drive member has a preferably cylindrical power drive 30 on a first end 34. A power input recess 33 in the drive, shown square, is used to turn the power drive member. A power shaft 31 transfers force to the tool press member 2 and through the press member to manipulating member 1. The power shaft terminates in a second end 35. The power shaft has a recessed or flat area 32 formed on the cylindrical power shaft 31 adjacent the second end 35. The recessed or flat area 32 provides an area that receives the set screw 24 end, or other means to secure the power drive member 3 to the press member 2. The size and shape of the power input and the means for securing the power drive to the press member are irrelevant in that any common means can be used to drive and secure the members together.

A locking bar 4 is shown in FIG. 7. It is used to position the tool on a housing using a stud on the housing. The locking bar body 40 has a first end 41, a second end 42, a first side 46 and a second side 47. A power shaft aperture 48 is formed adjacent the first end 41. The first side 46 extends from the first end 41 to the second end 42. A portion of the second side 47 extends from the first end 41 to a stud recess 45 having a surface forming an inner angular stud guide 49 and a slot extending a distance parallel to the first and second sides. The slot terminates in a pocket 45' that is preferably essentially the same size as the stud used to secure the locking bar. The slot pocket with the second side adjacent the second end 42 forms a hook 44 with the inner surface of the hook forming a portion of the pocket 45'. The second side second end at the hook is joined to the second end 42 by an angular outer stud guide 43.

FIGS. 8 and 9 show the tool members assembled forming the shaft manipulating and centering tool 6. The members of the tool are joined by passing the power shaft 31 of the tool drive member 3 through the power shaft aperture 48 of the locking bar 4, placing the press member 2 within the yoke members 17 of the shaft manipulator, aligning the press member power shaft aperture 27 with the power shaft aperture 11 and passing the power shaft 31 through the shaft manipulator power shaft aperture 11 and the press member power shaft aperture 27. The set screw 24 of the press member 2 is then turned inward to press the set screw 24 end onto and/or into the recess or flat 32 formed on the power drive member power shaft 31. This secures the power drive 3 to the press member 2 and retains the shaft manipulating member 1 and locking bar member 4 on the power drive member 3. The locking bar 4 has a 360° free rotation about the power shaft 31. The shaft manipulator has limited rotation about the power shaft 31. The press member 2 arcuate section 22 center of rotation is concentric with that of power shaft aperture 27 and power shaft 31. With the distance between the center of rotation of the power shaft 31 and arcuate press member section surface 22 being somewhat less than the minimum distance between the center of rotation of the power shaft 31 and the slot 19 flat 18 of the manipulating member 1, the arcuate surface 22 is free to rotate over the slot flat 18 of the manipulating member 1. Since the distance between the center of rotation of the press member and the first end flat 21 and second side flat 23 both increase as the distance between the arcuate section surface 22 increases along the flat sections, the flat sections of the first end and second side will contact the flat area 18 of the manipulator member 1 as the power shaft rotates the press member beyond or past the arcuate section surface area 22. The rotation of the press member 2 relative to the shaft manipulator is limited by the press member first end flat 21 and second side flat 23 contact with the shaft manipulator flat 18. The rotation of the press member 2 within the shaft manipulator yoke from the press member inner first end flat 21 to the second side flat 23 contact with the shaft manipulator flat 18, gives a relative rotation between the two members of essentially 90°. The exact amount of relative rotation between the two members can be controlled by adjusting the distance between the press member arcuate surface 22 and the manipulating member flat 18 or by controlling the angle formed between the press member first end flat 21 and second side flat 23.

Figure 12:
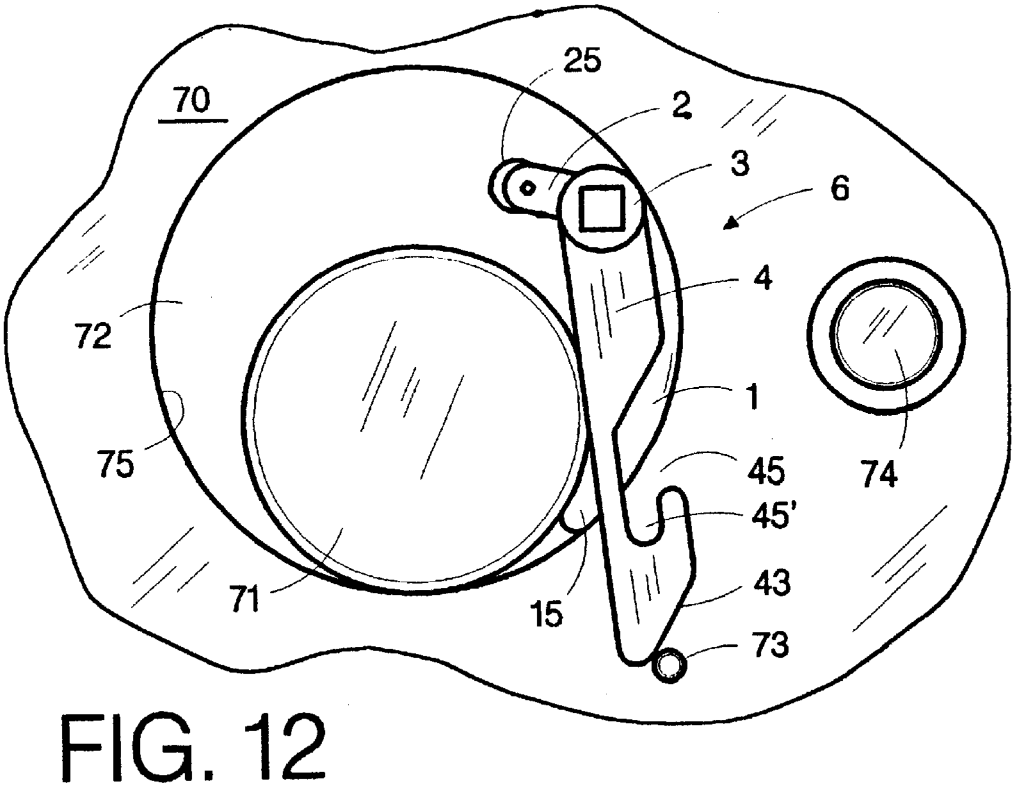
FIG. 12 is a front view of the tool in a starting position in a housing bore with a shaft in the bore.
Figure 13:
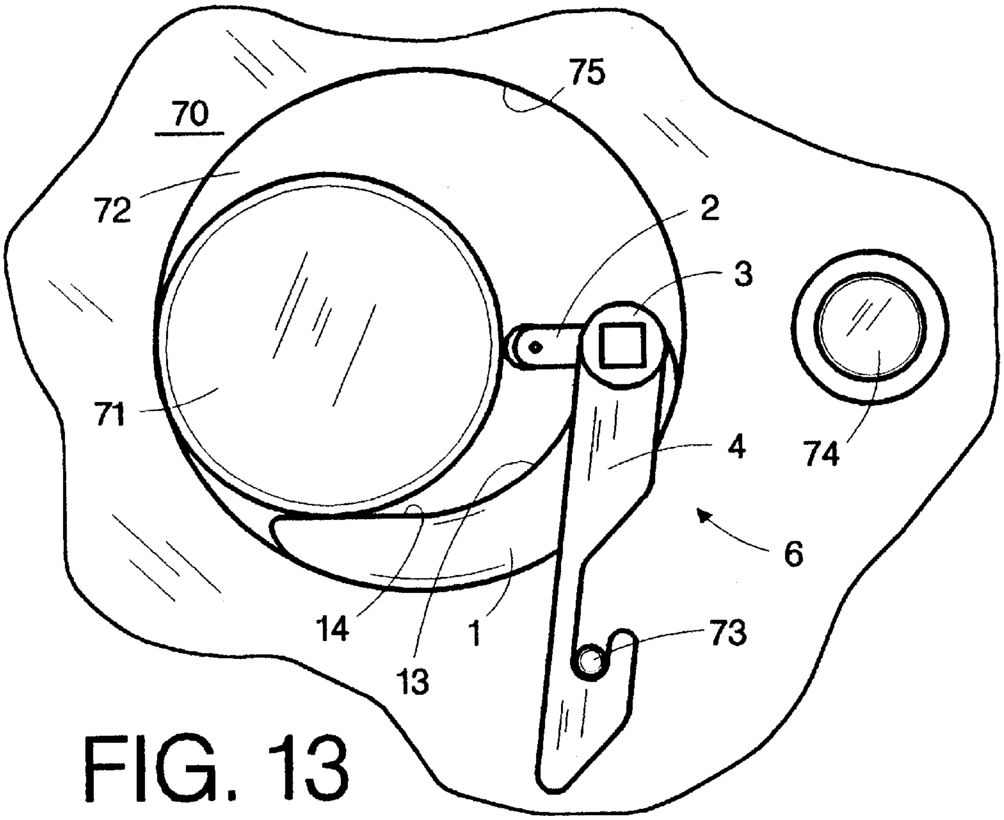
FIG. 13 is a front view of the tool holding a shaft in an "out-of-the way" position.

The tool can be used for manipulating shafts and for positioning shafts, such as during assembly, and for centering shafts within openings in housings. As an example of the tool use, FIGS. 12 and 13 show the tool 6 used with a shaft 71 in a housing 70 bearing retaining opening 72. In FIG. 12 the shaft 71 is at the bottom of the opening or bore hole 72 due to gravity. The tool is positioned beside the shaft 71 in the bore 72 with the second end 15 of the shaft manipulating member positioned at the lower side of the shaft 71. A power bar, ratchet, or other means is used to rotate the power shaft 31 of the tool drive member in one direction, clockwise as shown in FIG. 12. This movement rotates the press member 2 until a contact area of the roller 25 of the press member contacts the inner surface 75 of the housing 70 within the bore 72 and a press member flat contacts the shaft manipulator flat 18. The further rotation of the press member causes the roller 25 to press against the housing inner surface and forces the manipulator end 15 under the shaft 71 both rasing the shaft 71 and moving it to the left. At the same time, the locking bar member 4 outer stud guide 43 is lowered passing over the stud 73. When the stud recess 45 of the locking bar reaches the stud, the locking bar stud recess 45 drops over the stud. Once this position is reached, the power drive shaft can be rotated in the other direction, in the counterclockwise direction as shown in FIG. 12. This rotation lifts the locking bar 4 positioning the stud 73 within the hook or stud lock recess or pocket 45', securing the tool 6 to the stud. At the same time, the press member 2 is rotated counterclockwise so that the press member roller 25 pivots to press the shaft 71 to the left along the shaft manipulator member 1 inner flat section 14, as shown in FIG. 13. With the shaft 71 in this position, the shaft 71, and any gears thereon, can be easily rotated with one finger and the drive or other shaft 74, and any gears thereon, can also be rotated with one finger. This allows any gears on the shaft 71, such as those of a transmission counter shaft, and any gears on the drive shaft 74, to be easily aligned. After alignment, the power shaft 31 can again be rotated in the one direction, clockwise in FIG. 13. This rotation pivots the roller 25 of the press member away from the shaft 71, rotates the shaft manipulator along the housing bore wall 75 forcing the shaft 71 up and away from the bore wall 75, allowing gravity to drop the shaft into the inner radius 13 of the shaft manipulator 1. With the inner radius 13 of the shaft manipulator 1 the same curvature as the shaft 71 and with the outer radius 16 of the shaft manipulator the same curvature as the housing bore wall 75, the shaft 71 will be perfectly centered within the housing bore 72. At the same time the power shaft is being rotated clockwise, any gears on the shaft or counter shaft 71 and any gears on the drive shaft 74 will be shifted into mesh with one another as the shaft 71 moves toward the drive shaft 74. This use of the tool and procedure provides an easy alignment and assembly for the gears within a housing.

FIGS. 10 and 11 show a one piece shaft centering and positioning device 5 for use with the tool 6. The centering device 5 has a one piece body 50 with an outer surface or housing bore abutment 52, that is essentially the same diameter and curvature as the bore surface 75, and an inner opening 53, that has a surface or shaft bore abutment 55 that is essentially the same diameter and curvature as the shaft 71. The shaft positioning and centering device 5 is provided with a handle 51 for controlling the one piece body 50 of the device. An extension 54 secures the handle 51 to the shaft positioning body 50.

After the tool 6 has centered the shaft 71 in the shaft manipulating member 1 inner surface 13, the shaft with any gears on it are in mesh. The shaft positioning device 5 is installed at the rear, opposite, other end, or second end of the shaft 71 with the shaft 71 in the positioning device 5 inner opening 53 and the bore abutment 52 within the housing opening. With the second end of the shaft centered and the position device in place, the tool 6 can be removed from the housing bore 72 and the bearings inserted between the shaft 71 and bore housing wall 75 at the front side of the housing. Once the bearings have been inserted at the first end of the housing, the shaft positioning device 5 can be removed from the rear or other end of the housing and the rear or opposite end bearings installed. This can be done as with any one of the bearings and the positioning and centering device in position, the entire shaft 71 will be centered and held within the housing bore 72.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What is claimed is:

1. A process for manipulating a shaft within a housing bore in a housing comprising:

placing a shaped shaft manipulating member with a pivotally attached presser member beside said shaft within said housing bore;

moving said shaft relative to said shaped shaft manipulating member within said housing bore by turning said presser member within said bore and pivoting said presser member relative to said shaped shaft manipulating member.

2. A process for manipulating a shaft within a housing bore in a housing as in claim 1 further comprising:

moving said shape shaft manipulating member within said housing bore relative to said shaft by turning said presser member within said bore in one direction to press said shaped shaft manipulating member against said shaft.

3. A process for manipulating a shaft within a housing bore in a housing as in claim 2 further comprising:

moving a flat portion of said shaped shaft manipulation member under said shaft by rotating a presser member contact area of said presser member against said housing within said housing bore.

4. A process for manipulating a shaft within a housing bore in a housing as in claim 3 further comprising:

centering said shaft by rotating said presser member contact area against said housing within said housing bore to move said shaped shaft manipulating member under said shaft and along said housing within said housing bore until an arcuate portion of said shaped shaft manipulation member is under said shaft.

5. A process for manipulating a shaft within a housing bore in a housing as in claim 4 further comprising:

preventing reverse movement of said shaped shaft manipulating member by use of a locking bar pivotally attached to said shaped shaft manipulating member.

6. A process for manipulating a shaft within a housing bore in a housing as in claim 5 further comprising:

attaching said locking bar to said housing using a stud in said housing to anchor an end of said locking bar.

7. A process for manipulating a shaft within a housing bore in a housing as in claim 6 further comprising:

attaching said locking bar to said stud by rotating said presser member first in one direction to position a hook stud holding means on said locking bar with said stud and then reversing said direction of rotation to engage said hook stud holding means with said stud.

8. A process for manipulating a shaft within a housing bore in a housing as in claim 3 further comprising:

pressing said shaft against said housing within said housing bore by rotating said presser member in the reverse direction to cause said presser member contact area to engage and press against said shaft;

rotating said shaft to position it as desired.

9. A process for manipulating a shaft within a housing bore in a housing as in claim 8 further comprising:

said shaft having a first end and a second end and said housing having a first bore and a second bore with said shaped shaft manipulating member and pivotably attached presser member being placed adjacent said shaft first end in said housing first bore;

centering said shaft first end by rotating said presser member contact area against said housing within said housing bore to move said shaped shaft manipulating member under said shaft and along said housing within said housing bore until an arcuate portion of said shaped shaft manipulation member is under said shaft;

centering and securing said shaft second end by inserting a shaft centering and positioning device around said shaft second end within said housing second bore.

10. A process for manipulating a shaft within a housing bore in a housing as in claim 9 further comprising:

removing said shaped shaft manipulating member and presser member from said housing first bore around said shaft first end;

placing bearings in said housing around said shaft first end and within said housing first bore.

11. A process for manipulating a shaft within a housing bore in a housing as in claim 10 further comprising:

removing said shaped shaft centering and positioning device from around said shaft second end and said housing second bore;

placing bearings around said shaft second end and in said housing second bore.

12. A process for manipulating a shaft within a housing bore in a housing as in claim 2 further comprising:

rotating said presser member by turning a power shaft attached to said presser member;

moving said shaft against said housing wall within said housing bore by turning said presser member within said bore in a direction opposite to said one direction for enabling free rotation of said shaft.

13. A process for manipulating a shaft within a housing bore in a housing as in claim 12 further comprising:

centering said shaft within said housing bore by raising said shaft until it falls into an arcuate section of said shaped shaft manipulating member.

14. A process for manipulating a shaft within a housing bore in a housing as in claim 1 further comprising:

preventing reverse movement of said shaped shaft manipulating member by use of a locking bar having a first end and a second end;

attaching said first end of said locking bar to said shaped shaft manipulating member.

15. A process for manipulating a shaft within a housing bore in a housing as in claim 14 further comprising:

attaching said locking bar second end to said housing by using a stud in said housing to anchor said second end of said locking bar;

attaching said locking bar to said stud by rotating said presser member first in one direction and then reversing said direction of rotation.

16. A process for manipulating a shaft within a housing bore in a housing as in claim 15 further comprising:

rotating a power drive shaft attached to a first end of said presser member to press a second end of said presser member against said housing within said housing bore.

17. A process for manipulating a shaft within housing bores in a housing comprising:

providing a shaft centering and manipulating tool having a manipulating member and a pressing member;

said tool manipulating member having an inner side with an arcuate section adjacent a first end and a flat section adjacent a second end, positioning said flat section beside a first end of said shaft resting on a bottom surface of a first housing bore formed in said housing;

said presser member having a first end pivoted adjacent said manipulating member first end and having a second end with a surface contacting area, engaging said presser member second end contacting area with said housing surface forming said first housing bore by rotating said presser member a first time in one direction;

pressing said manipulating member flat section under said shaft first end by applying pressure developed by rotation of said presser member contact area against said housing surface forming said first housing bore;

moving said shaft to a side surface of said first housing bore by rotating said presser member in a direction opposite to said first time one direction such that said presser member contact area leaves said housing surface forming said first housing bore and contacts a surface of said shaft first end to move said shaft along said manipulating member flat section to said surface of said housing forming said first housing bore;

rotating said shaft as desired until it is placed in a preferred position.

18. A process for manipulating a shaft within housing bores in a housing as in claim 17 further comprising:

a locking bar member having a pivot means adjacent a first end and a hook stud holding means adjacent a second end preventing unwanted rotation of said shaft centering and manipulating tool within said first housing bore due to said shaft weight by attaching said locking bar member to said housing;

attaching said locking bar member to said housing by moving said hook stud holding means to a housing stud by said first time one direction rotation of said presser member;

moving said hook stud holding means to engage said stud within the hook of said locking bar member hook stud holding means by rotating said pressure member in a direction opposite to said first time one direction rotation.

19. A process for manipulating a shaft within housing bores in a housing as in claim 17 further comprising:

centering said shaft within said first housing bore by rotating said tool manipulating member a second time in said first time one direction until said shaft is lifted along said housing surface forming said first housing bore and said shaft falls into said manipulating member arcuate section.

20. A process for manipulating a shaft within housing bores in a housing as in claim 19 further comprising:

a shaft centering and positioning device having an outer circular abutment surface essentially the same size and shape as a second housing bore formed in said housing and a central inner opening essentially the same size and shape as a second end of said shaft, positioning said shaft centering and positioning device around said second end of said shaft and in a second housing bore;

removing said shaft centering and manipulating tool from said first housing bore;

placing bearings around said shaft first end and within said first housing bore while said shaft second end is held in position by said shaft centering and positioning device;

removing said shaft centering and positioning device from said housing second bore and placing bearings around said shaft second end and within said housing second bore to hold said shaft rotatably in place within said housing first and second bores.

* * * * *